March 7, 1944.  F. KLEIN  2,343,774
FAUCET ATTACHMENT
Filed Oct. 18, 1940
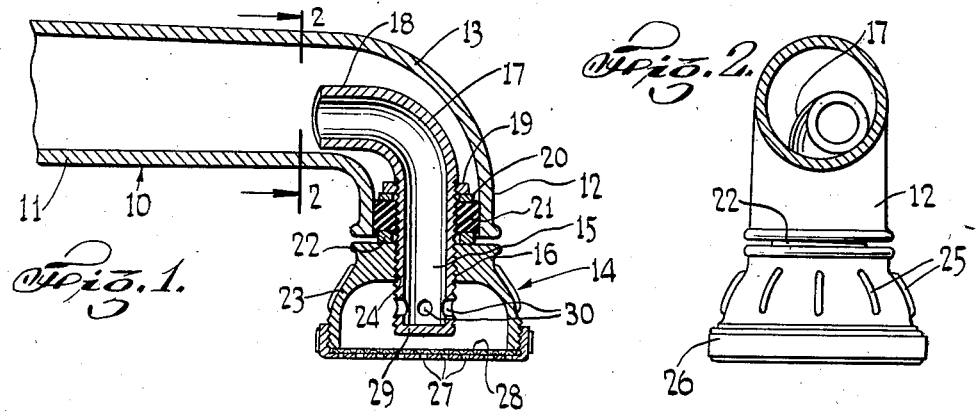
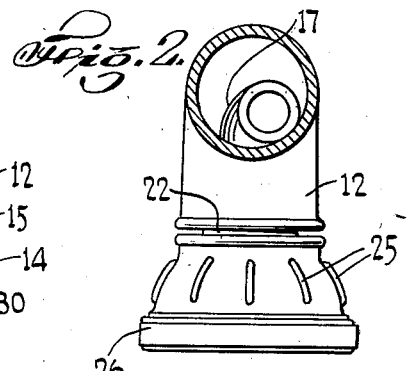
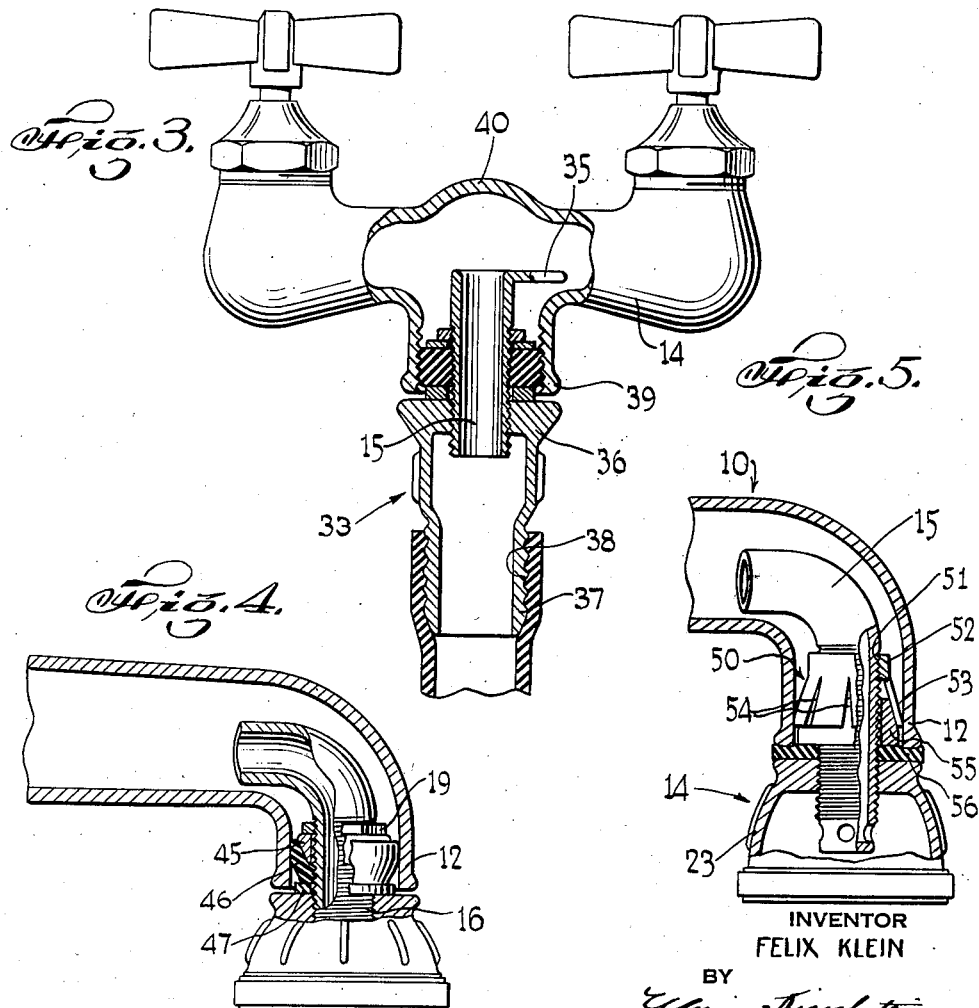
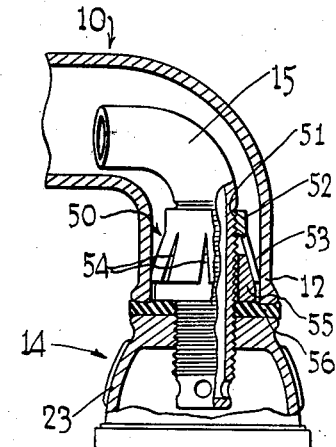
INVENTOR
FELIX KLEIN
BY
ATTORNEY Patented Mar. 7, 1944

2,343,774

UNITED STATES PATENT OFFICE 2,343,774

FAUCET ATTACHMENT

Felix Klein, Bayside, Long Island, N. Y.

Application October 18, 1940, Serial No. 361,704

6 Claims. (Cl. 285—165)

This invention relates to faucet attachments.

One of the objects of my invention is to provide a faucet attachment adapted to be easily coupled with any standard plumbing fixture which has a bent portion adjacent its water outlet.

Another object of my invention is to provide a faucet attachment of the character described with which various faucet adjuncts such as strainers or hose couplers may be interchangeably employed.

Another object of my invention is to provide a faucet attachment of the character described which may be easily inserted and tightened into a plumbing fixture and which will permit an ample flow of water.

Another object of my invention is to provide a faucet attachment of the character described which will comprise but few parts and which will be economical to manufacture, rugged in construction, and highly efficient in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

In the accompanying drawing, in which are shown several possible embodiments of this invention, Fig. 1 is a side view in section of an auxiliary strainer attachment embodying my invention coupled into the spout of a kitchen plumbing fixture;

Fig. 2 is a sectional view taken substantially along the line 2—2 of Fig. 1;

Fig. 3 is a front sectional view of a hose coupling embodying a modified form of my invention attached to a bathroom plumbing fixture; and Figs. 4 and 5 are views similar to Fig. 1, showing still other modified forms of my invention.

In general, I carry out my invention by providing an expansion member mounted on a threaded nipple which has a projection adapted to abut a wall of a plumbing fixture so as to prevent rotation of the nipple while an attachment body is screwed on to the nipple and by causing the expansion member to move outwardly and grip the nozzle of the fixture when the attachment body is turned.

Referring now to the drawing, and more particularly to Figs. 1 and 2, I have illustrated a typical plumbing fixture spout 10 having a horizontal leg 11 leading from the mixing chamber or valve of a plumbing fixture (not shown), a discharge nozzle 12 substantially vertically disposed, and a bend 13 interconnecting said horizontal leg and nozzle. The auxiliary strainer attachment 14, which is constructed in accordance with my invention, comprises a nipple 15 having a long external thread 16 running from the lower end thereof and a bend 17 and short tubular leg 18 integrally formed at its upper end.

Disposed on the upper portion of the thread 16 is a nut 19 which serves as an abutment member for a washer 20 having a central aperture which is slightly greater in diameter than the outer diameter of the thread 16. An expansion collar 21 of yielding resilient material, such as rubber, encircles the threaded nipple 15 immediately below said washer 20. Said collar 21 is provided with a central aperture of substantially the same size as that of the washer 20. The outer diameter of the collar is made slightly smaller than the inner diameter of the discharge nozzle 12. A second washer 22 similar to the washer 20 is positioned below the collar 21.

A strainer body 23 having a central tapped aperture 24 is threaded on the nipple 15 and may be provided at its outer surface with a plurality of longitudinally disposed ribs 25 to facilitate rotation of the body relative to the nipple 15. Suitably attached to the lower part of the strainer body, as by means of mating threads, is a cap 26 having a plurality of perforations 27. If desired, a filter screen 28 may overlie the perforations 27, being held in position by means of the cap 26. In order to prevent the full impact of the water stream discharged from the nipple 15 from striking the screen 28 and passing through the perforations 27 at a high, splashing velocity, the end of the nipple 15 may be closed off by a wall 29 and a plurality of apertures 30 provided adjacent said wall 29.

The strainer attachment 14 is assembled by first running the nut 19 to the upper extremity of the thread 16 and slipping the washers 20 and 22 into the nipple 15 with the rubber collar 21 disposed therebetween. The strainer body 23 is then threaded onto the body 15 for a short distance and the washers 20 and 22 and collar 21 allowed to slide down and rest thereupon.

When it is desired to insert the attachment into a spout 10, the short leg 18 and bend 17 are inserted through the nozzle 12 and bend 13 so that the short leg 18 lies either in the horizontal leg 11 or bend 13 of the spout. The body 23 is then manually rotated, the short leg 18 abutting against a wall of the spout 10, as clearly shown in Fig. 2, to prevent rotation of the nipple 15. As the strainer body 23 moves upwardly it will cause the rubber collar 21 to be compressed between the two washers 20 and 22 and expand the lateral walls thereof outwardly until they firmly press against the interior surface of the discharge nozzle 12. At the same time the walls of the bore in the collar 21 will bulge inwardly and cause the collar to constrict about the thread 16. It will thus be seen that after the strainer body 23 is fully tightened the strainer attachment 14 will be firmly coupled to the spout 10 with all the coupling members other than the strainer body itself concealed within the said spout.

During insertion of the leg 18 and bend 17 into the spout 10, the nipple 15 may be inclined to facilitate its entry. However, the nipple should be substantially vertically disposed before tightening the attachment 14 in its final position.

It should be noted that while turning the strainer body 23 to apply squeezing pressure on both sides of the rubber collar 21, the leg 18, which is abutting against the side wall of the spout 10, will move downwardly and occasionally this leg 18 may reach the bottom wall of the spout 10 before the attachment 14 is fully tightend. In such case the strainer body 23 should be unscrewed and the attachment 14 removed from the spout. The nut 19 is then run down on the thread 16 and the attachment re-inserted and tightened up in the manner above described.

In the form of my invention shown in Fig. 3, I have provided the nipple 15 with an arm 35 in lieu of the bend 17 and leg 18 to abut a side wall of the angularly disposed portion of a plumbing fixture. Also, in this modification I have shown a hose attachment body 36 having a corrugated portion 37 over which an end of a length of hose 38 is stretched. The attachment 33 in this Fig. 3 is inserted in the discharge nozzle 39 of a bathtub mixing faucet 40 and the projecting arm 35 will abut, during turning of the hose attachment body 36, against the side walls of the horizontal part 41 of the fixture 40, said walls being angularly disposed with respect to the discharge nozzle 39.

In Fig. 4, I have shown an alternative means for causing the expansion collar to engage the interior surface of the discharge nozzle. In this embodiment of my invention the upper washer 45 which abuts the nut 19 is provided with a conical outer surface which is adapted to be forced into the central aperture of the expansion collar 46 to urge the upper portion of the collar against the interior surface of the discharge nozzle 12. At the same time, the lower portion of the collar 46 will be squeezed between the beveled washer 45 and the lower washer 47 to cause the walls of the bore in the collar to be bulged inwardly and constricted about the thread 16.

In Fig. 5 the attachment 14 is held in the spout 10 by a cup 50 having a tapped aperture 51 in its base 52 engaging the running thread 16. The lateral walls of the cup 53 are provided with several slots 54 to permit expansion of the cup when the conical washer 55 is moved upwardly by rotation of the strainer body 23. To prevent leakage of water around the exterior of the attachment 14, I also provide a rubber washer 56 between the upper face of the body 23 and the lower end of the discharge nozzle 12.

It will be noted that in all embodiments of my invention the faucet attachment may be coupled by simply turning the attachment body with one hand and that the attachment may be employed with spouts which have widely varying sizes and shapes as the expansion members may be distorted greatly beyond their normal size.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. For use with a plumbing fixture having a discharge nozzle extending at an angle from a passageway, an attachment comprising a tubular member adapted to be received in said nozzle and having an angled extension at its inner end adapted to be received in said passageway in such manner that the side walls of said passageway act as a stop in cooperation with said extension to prevent rotation of said tubular member, an expansible member on said tubular member, and means supported on and rotatable relative to said tubular member to expand said expansible member.

2. An attachment as set forth in claim 1 wherein said expansible member is anchored to said tubular member at a point remote from the means for expanding said expansible member.

3. A faucet attachment as set forth in claim 1 wherein a beveled member is slidably mounted on the tubular member and is urged upon turning of the expanding means into engagement with the expansible member for radially outward expansion thereof.

4. A faucet attachment as set forth in claim 1 wherein the expansible member comprises a slotted cup threadedly mounted on the tubular member and wherein there is provided a beveled member slidably mounted on said tubular member, which beveled member upon turning of the expanding means urges portions of said slotted cup radially outwardly to engage the internal walls of said discharge nozzle.

5. A faucet attachment as set forth in claim 1 wherein the expansible member is anchored to the tubular member at a point remote from the expanding means and wherein there is provided a beveled member received on said tubular member between the anchor and the expanding means, which beveled member on turning of said expanding means will expand said collar radially outwardly into engagement with the internal walls of said discharge nozzle.

6. A faucet attachment as set forth in claim 1 wherein the angled extension is tubular and comprises an integral extension of the tubular member.

FELIX KLEIN.